United States Patent
Heier et al.

(10) Patent No.: US 7,150,319 B2
(45) Date of Patent: Dec. 19, 2006

(54) METHOD FOR REDUCING OR COMPLETELY ELIMINATING WATER INFLUX IN AN UNDERGROUND FORMATION, AND CROSSLINKABLE COPOLYMERS FOR IMPLEMENTING SAID METHOD

(75) Inventors: Karl Heinz Heier, Frankfurt am Main (DE); Christoph Kayser, Mainz (DE); Aranka Tardi, Neuberg (DE); Michael Schaefer, Gruendau (DE); Roman Morschhaeuser, Mainz (DE); James C Morgan, Yateley (GB); Alistair M. Gunn, Reading (GB)

(73) Assignee: Clariant UK Ltd., West Yorkshire (GB)

( * ) Notice: Subject to any disclaimer, the term of this patent is extended or adjusted under 35 U.S.C. 154(b) by 77 days.

(21) Appl. No.: 10/492,000

(22) PCT Filed: Sep. 24, 2002

(86) PCT No.: PCT/EP02/10683

§ 371 (c)(1),
(2), (4) Date: Apr. 6, 2004

(87) PCT Pub. No.: WO03/033860

PCT Pub. Date: Apr. 24, 2003

(65) Prior Publication Data

US 2004/0244975 A1     Dec. 9, 2004

(30) Foreign Application Priority Data

Oct. 12, 2001   (DE) ................. 101 50 190

(51) Int. Cl.
E21B 33/138     (2006.01)
E21B 43/20      (2006.01)
C08F 220/00     (2006.01)
C08F 220/54     (2006.01)

(52) U.S. Cl. ............ 166/263; 166/270; 166/295; 166/300; 507/226; 507/229; 507/271; 526/278; 526/287; 523/130

(58) Field of Classification Search ........... 166/263, 166/270, 295, 300; 405/264; 507/226, 229, 507/271; 526/240, 263, 278, 271; 523/130
See application file for complete search history.

(56) References Cited

U.S. PATENT DOCUMENTS 3,308,885 A    3/1967    Sandiford (Continued)

FOREIGN PATENT DOCUMENTS

DE    1 301 566    8/1969

(Continued)

*Primary Examiner*—George Suchfield
(74) *Attorney, Agent, or Firm*—Richard P. Silverman

(57) ABSTRACT

A method for reducing or completely eliminating water influx in an oil or natural gas borehole includes introducing in the borehole an aqueous solution of a copolymer comprising: A) 40–98 wt. % of structural units of formula (I), wherein: $R^1$ is hydrogen or methyl; $R^2$ represents $C_2$–$C_{10}$ alkylene; and $Me^+$ represents an ammonium metal ion and an alkali metal ion; B) 0.1 to 58 wt. % of structural units of formula (II); C) 0.1 to 10 wt. % of structural units of formula (III), wherein: $R^3$ and $R^4$ independently of each other represent hydrogen, methyl or ethyl, or $R^3$ and $R^4$ represent together a propylene group, which, with inclusion of a radical (A), form a pyrrolidon radical or, with inclusion of a pentamethylene group, forms a caprolactam radical; D) 0.10 to 10 wt % of structural units of formula (IV). The method also includes introducing in the ground or deposit, simultaneously with the copolymer or subsequently, an agent for crosslinking the copolymer.

24 Claims, 1 Drawing Sheet

U.S. PATENT DOCUMENTS

| | | | |
|---|---|---|---|
| 4,095,651 A | 6/1978 | Chaveteau et al. | 166/294 |
| 4,718,491 A | 1/1988 | Kholer et al. | 166/294 |
| 4,842,071 A | 6/1989 | Zaitoun et al. | 166/295 |
| 5,079,278 A | 1/1992 | Mitchell | 523/130 |
| 5,244,988 A * | 9/1993 | Hughes et al. | 526/93 |
| 5,318,719 A * | 6/1994 | Hughes et al. | 8/137 |
| 5,379,841 A | 1/1995 | Pusch et al. | 166/295 |
| 6,033,524 A * | 3/2000 | Pruszynski et al. | 162/165 |
| 6,395,853 B1 | 5/2002 | Oswald et al. | 526/307.2 |
| 6,451,756 B1 * | 9/2002 | Shulman et al. | 510/475 |
| 6,465,397 B1 | 10/2002 | Patterson | 507/222 |
| 7,056,868 B1 * | 6/2006 | Benton et al. | 507/226 |
| 2003/0109385 A1 | 6/2003 | Gunn et al. | 507/200 |
| 2004/0177957 A1 * | 9/2004 | Kalfayan et al. | 166/270 |

FOREIGN PATENT DOCUMENTS

| | | |
|---|---|---|
| EP | 0 577 931 | 6/1998 |
| EP | 1 059 316 | 12/2000 |
| GB | 1147852 | 4/1969 |
| WO | WO 01/49971 | 7/2001 |
| WO | WO 01/59254 | 8/2001 |

* cited by examiner

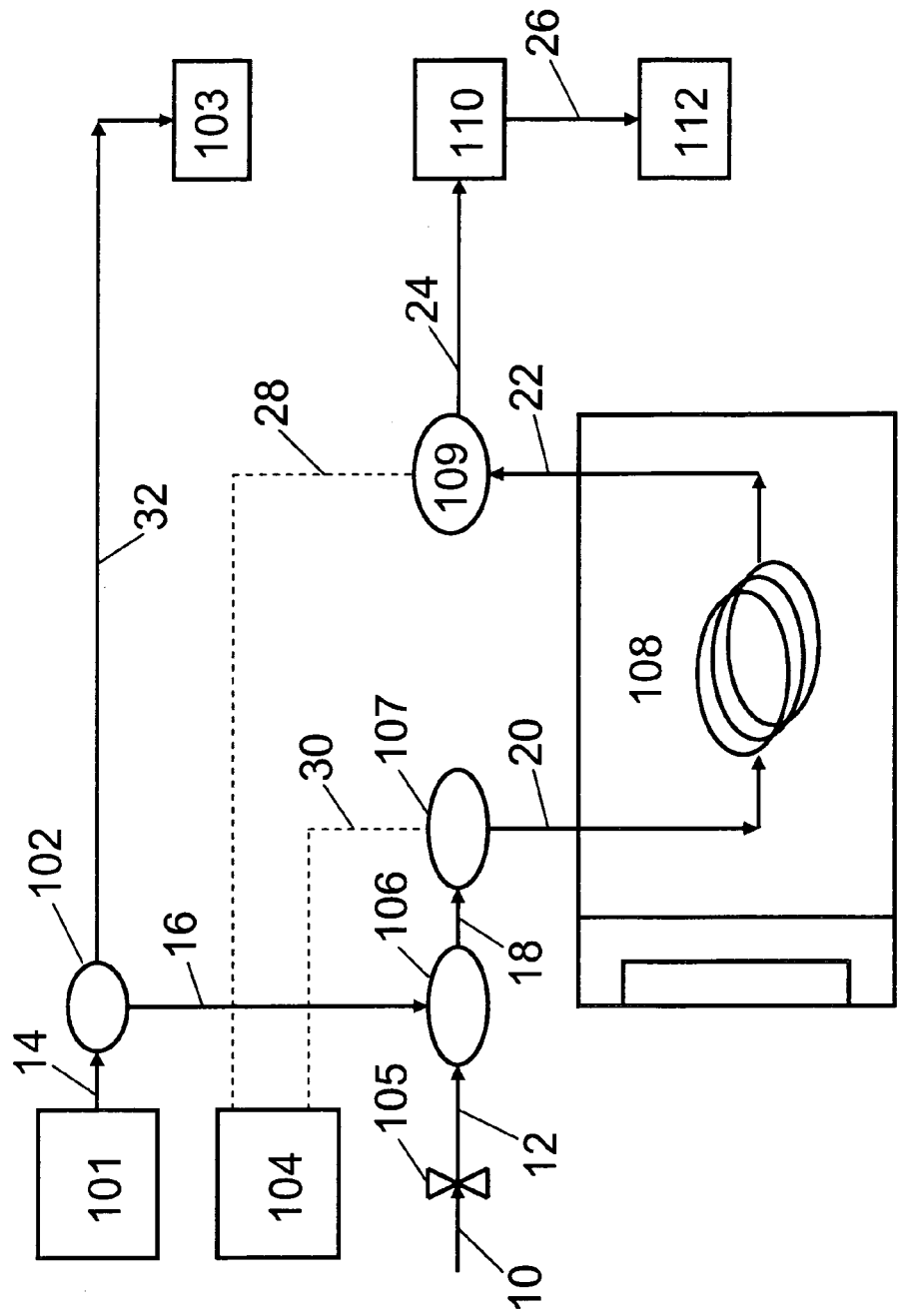

METHOD FOR REDUCING OR COMPLETELY ELIMINATING WATER INFLUX IN AN UNDERGROUND FORMATION, AND CROSSLINKABLE COPOLYMERS FOR IMPLEMENTING SAID METHOD

FIELD OF THE INVENTION

Method for reducing or completely eliminating water influx in an underground formation, and crosslinkable copolymers for implementing said method

BACKGROUND OF THE INVENTION

The present invention relates to a method for reducing or completely eliminating water influx in an underground formation which contains hydrocarbons to the production borehole. The present invention furthermore relates to crosslinkable copolymers which can be used in the method. By means of this method, the blockage of water is achieved without thereby making it more difficult for oil and/or hydrocarbon gas to gain access to the borehole.

Water often exists as salt solution in the same formation as oil or gas. The recovery of oil or of hydrocarbon gas therefore entails the recovery of water in an amount such that it gives rise to considerable problems; it directly or indirectly causes deposition of salts in the vicinity of the borehole or in the borehole itself, it considerably increases the corrosion of all metal parts underground or aboveground, it increases the amounts of the pumped, transferred and stored liquids without benefits and, together with the oil, it creates emulsions which are difficult to break aboveground and which may form blockages underground in the cavities of the formation.

According to the prior art, numerous methods which are intended for reducing the water influx into the boreholes for the recovery of oil or hydrocarbon gas have been proposed and practiced. They often consist in introducing an impenetrable barrier in the formation between the water and the borehole or between the water and the oil or hydrocarbon gas. The means usually introduced block virtually just as much oil or hydrocarbon gas as water. The components of this barrier may be: cement, resins, suspensions of solid parts, paraffins or water-soluble polymers which are crosslinked by introduction of so-called crosslinking agents in the deposit.

At present, polymers are used which are introduced in solution into the porous medium, are adsorbed at the surface of the solid and penetrate into the pore space, so that they are suitable for reducing the water influx. In contrast, the nonaqueous fluids, such as oil or especially hydrocarbon gas, pass through the adsorbed macromolecules, which now occupy a negligible volume on the wall and thus leave the passage substantially unobstructed.

U.S. Pat. No. 4,095,651 discloses the use of hydrolyzed polyacrylamides. However, it has been found that this type of polymer is effective mainly against water having a low salt content and is rendered ineffective by water having a higher salt content. At relatively high temperatures, in the presence of polyvalent ions, these polymers tend to form precipitates which may block the pores of the rock formations.

U.S. Pat. No. 4,718,491 discloses the use of polysaccharides. Although these compounds, which are poorly injectable into the pore space, result in a delay or reduction of the water influx, they permit only incomplete utilization of the existing hydrocarbon reserves of the deposits or lose their activity at relatively high temperatures.

U.S. Pat. No. 4,842,071 discloses the use of unhydrolyzed acrylamide polymers or acrylamide copolymers, which are hydrolyzed by subsequent introduction of an aqueous basic solution. This method has disadvantages with regard to an additional effort due to the introduction of a further solution, and due to the problems of the accessibility of the injected polymer solution as a result of the subsequent placement of the basic solution and with regard to an increased corrosion susceptibility of the apparatuses used. Moreover, the polymer solution is effective only after reaction with the aqueous basic solution, the degree of effectiveness being determined by the degree of reaction.

EP-B-0 577 931 discloses a method for water blockage which makes use of polymers of 5–90% by weight of AMPS, from 5 to 95% by weight of N-vinylamides and, if required, up to 90% by weight of N,N-diallylammonium compounds and, if required, up to 90% by weight of a further olefinically unsaturated monomer. These polymers are uncrosslinked. This method is effective only in the case of relatively low permeabilities, for example in the case of gas probes having permeabilities in the region of a few mD (millidarcy).

WO-01/49971 discloses copolymers and a method for water blockage using these copolymers, which contain structural units of vinylphosphonic acid, acrylamide and, if required, also AMPS and N-vinylformamide, and which may be crosslinked with zirconium compounds. The amount of the crosslinkable phosphonic acid and carboxyl groups must be from 0.01 to 7.5 mol %.

SUMMARY OF THE INVENTION

It is an object of the invention to provide a method for reducing the water influx in production boreholes without reducing the recovery of oil or hydrocarbon gas.

Surprisingly, it has been found that water-soluble copolymers based on acrylamidoalkylenesulfonic acid, N-vinylamides, acrylamide and vinylphosphonic acid, which were crosslinked during the application, are distinguished by high adsorption onto the rocks of the deposit, have elastic extension-compression behavior, exhibit particular stability to salts in deposit waters and can be used over a wide temperature range, in particular at relatively high temperatures. The thermal stability can be controlled by the ratio of acrylamide to acrylamidoalkylenesulfonic acid.

Surprisingly, it has furthermore been found that the increase in the proportion of acrylamidoalkylenesulfonic acid leads to increased stability of the crosslinked gel at elevated temperature. The possibility of stability control has some advantages. First, the lifetime of a treatment can increase at elevated deposit temperatures. This point can decide the cost-efficiency of a treatment. Deposits having temperatures of >80° C. frequently could no longer be economically treated.

A further advantage is the possibility of specifically selecting a polymer which is limited in the lifetime of its effectiveness under the planned conditions. Often, the effect of a treatment for modifying the relative permeabilities of a deposit is not known and initial treatments of a source are experimental. Such a treatment changes the entire liquid flows of the deposit. This has wide-ranging consequences for the formation of deposits, corrosion or the integrity of the formation. Where these results do not give the desired effect, it is desirable to be able to reverse the result of the treatment. A treatment which becomes ineffective again after a short test phase is therefore very advantageous in particular for the experimental implementation of the method.

BRIEF DESCRIPTION OF THE FIGURE

FIGURE is a schematic process flow diagram of the experimental setup.

DETAILED DESCRIPTION OF THE INVENTION

The method according to the invention must not be confused with the method for the tertiary recovery of oil, in which a polymer solution which generally has a low concentration (a few hundred ppm) is introduced through one or more injection boreholes, at a sufficient pressure for the solution to penetrate into the formation and to replace a part of the oil of this formation, which is then recovered by means of another series of production boreholes. The amounts introduced are of the order of magnitude of the volume of the formation. It is well known that polymer-containing water is much more effective for this recovery method since it is more viscous than the deposit water.

The method according to the invention which aims to reduce the water influx to a production probe in the course of production comprises introducing an amount of a polymer solution into the deposit—starting from this borehole—and crosslinking said polymer solution underground.

The present invention therefore relates to a method for reducing or completely eliminating water influx to a mineral oil or natural gas production borehole by introducing into this borehole an aqueous solution of a copolymer, the copolymer comprising A) 40–98% by weight of structural units of the formula

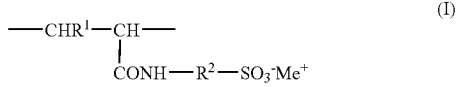

(I)

in which $R^1$ is hydrogen or methyl, $R^2$ is $C_2$–$C_{10}$-alkylene and $Me^+$ is an ammonium or an alkali metal ion, B) from 0.1 to 58% by weight of structural units of the formula

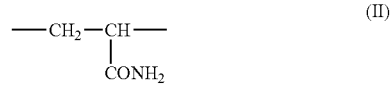

(II)

C) from 0.1 to 10% by weight of structural units of the formula

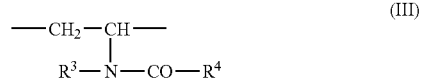

(III)

in which $R^3$ and $R^4$, independently of one another, are hydrogen, methyl or ethyl, or $R^3$ and $R^4$ together are a propylene group which, with inclusion of a radical

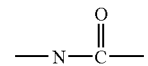

forms a pyrrolidone radical or, with inclusion of a pentamethylene group, forms a caprolactam radical, and D) from 0.1 to 10% by weight of structural units of the formula

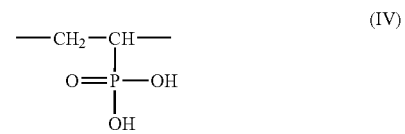

(IV)

and, simultaneously with the copolymer or thereafter, introducing into the formation or deposit a crosslinking agent of the copolymer, which crosslinking agent comprises at least one zirconium, chromium, titanium or aluminum compound, and then putting the borehole for the recovery of mineral oil and/or natural gas into operation.

The invention furthermore relates to a copolymer which comprises structural units A), B), C) and D) as defined above.

The invention furthermore relates to a composition comprising a copolymer which comprises structural units A), B), C) and D) as defined above, and at least one titanium, chromium, zirconium or aluminum compound.

The crosslinking agent is preferably introduced into the formation or deposit after the copolymer.

$R^2$ is preferably $C_2$–$C_6$-alkylene, particularly preferably $C_4$-alkylene. The structural units A) are preferably derived from 2-acrylamido-2-methylpropanesulfonic acid (AMPS). The copolymer preferably comprises from 50 to 98% by weight, in particular from 70 to 97.7% by weight, of the structural units derived from AMPS.

The structural units B) are preferably present in an amount of from 2 to 45% by weight, in particular from 5 to 40% by weight, in the copolymer.

In preferred structural units C), $R^3$ and $R^4$ are hydrogen.

The copolymer preferably comprises from 0.5 to 5% by weight, in particular from 0.8 to 3% by weight, of structural units C).

The structural units D) are preferably present in amounts of from 0.5 to 5, in particular from 0.8 to 3, % by weight.

The molecular weights of the copolymers are preferably from 50 000 to $2 \cdot 10^7$ g/mol. Particularly preferred molecular weights are from 500 000 to $10^7$ g/mol, in particular from $10^6$ to $8 \cdot 10^6$ g/mol.

In a further preferred embodiment, the structural units A), B), C) and D) sum to 100% by weight.

The copolymers are obtainable by copolymerization of the compounds from which the structural units of the formulae I, II, III and IV are derived. The copolymers are main chain copolymers and not graft copolymers.

The copolymerization can be carried out by all known polymerization methods in the range from pH 4 to 12, preferably from 6 to 9. It is preferably carried out as a gel polymerization.

The pH is expediently adjusted using alkaline salts of alkali metals, e.g. alkali metal carbonates, alkali metal bicarbonates, alkali metal borates, di- or trialkali metal phosphates, alkali metal hydroxides, ammonia or organic amines of the formula $N(R^7)_3$, in which $R^7$ is hydrogen, alkyl having 1 to 4 carbon atoms or hydroxyethyl and at least one of the radicals $R^7$ differs from hydrogen. Preferred bases for adjusting the pH are the abovementioned alkali metal compounds, in particular sodium hydroxide, potassium hydroxide, sodium carbonate, sodium bicarbonate, potassium carbonate and potassium bicarbonate and sodium and potassium borate. The polymerization reaction can be initiated by high-energy electromagnetic or corpuscular radiation or by substances which form free radicals. Accordingly, suitable polymerization initiators are organic per compounds, such as, for example, benzoyl peroxide, alkyl hydroperoxide, such as, for example, butyl hydroperoxide, cumene hydroperoxide or p-menthane hydroperoxide, dialkyl peroxides, such as, for example, di-tert-butyl peroxide, or inorganic per compounds, such as, for example, potassium persulfate or ammonium persulfate and hydrogen peroxide, and furthermore azo compounds, such as, for example, azobisisobutyronitrile, 2,2'-azobis(2-amidinopropan-e) hydrochloride or azobisisobutyramide. It is advantageous the organic or inorganic per compounds in combination with reducing substances are sodium pyrosulfite, sodium hydrogen sulfide, thionyl chloride, ascorbic acid or condensates of formaldehyde with sulfoxylates. The polymerization can particularly advantageously be carried out with the use of Mannich adducts of sulfinic acids, aldehydes and amino compounds, as have been described, for example, in DE-13 01 566.

It is furthermore known that it is possible to add to the polymerization batches small amounts of so-called moderators which harmonize the course of the reaction in such a way that they flatten the reaction rate-time diagram. They therefore lead to an improvement in the reproducibility of the reaction and thus permit the preparation of uniform products having extremely small quality deviations. Examples of suitable moderators of this type are nitrilotrispropionylamide or hydrohalides of monoalkylamines, dialkylamines or trialkylamines, such as, for example, dibutylamine hydrochloride. Such moderators can also advantageously be used in the preparation of the copolymers according to the invention.

Furthermore, so-called regulators may be added to the polymerization batches; these are those compounds which influence the molecular weight of the polymers prepared. Usable known regulators are, for example, alcohols, such as methanol, ethanol, propanol, isopropanol, n-butanol, sec-butanol and amyl alcohols, alkyl mercaptans, such as, for example, dodecyl mercaptan and tert-dodecyl mercaptan, isooctyl thioglycolate and some halogen compounds, such as, for example, carbon tetrachloride, chloroform and methylene chloride.

Usually, the polymerization is carried out in an inert gas atmosphere, preferably under nitrogen.

The reaction can be carried out in solution or in inverse emulsion or suspension, or under the conditions of precipitation polymerization at temperatures of from −5 to 120° C., preferably from 5 to 100° C. If water is used as a solvent for the polymerization reaction, said reaction takes place in solution, and an aqueous viscous solution of the copolymer is obtained.

The reaction product can be isolated either by distilling off the water from the solution or by mixing the aqueous solution with organic solvents which are completely miscible with water but in which the copolymer is insoluble. On addition of such organic solvents to the aqueous polymer solution, the polymer or copolymer formed is precipitated and can be separated from the liquid phase, for example by filtration. Preferably, however, the resulting aqueous solution of the polymer or copolymer is directly used further, if required after adjustment to a certain desired concentration.

If the copolymerization is carried out in an organic solvent, such as, for example, in a lower alkanol, e.g. in tert-butanol, it takes place under the conditions of precipitation polymerization. In this case, the polymer or copolymer formed is precipitated in solid form in the course of the reaction and can readily be isolated in a conventional manner, such as, for example, by filtration with suction and subsequent drying. Of course, it is also possible, and in some cases preferable, to distil the solvent out of the reaction batch.

The copolymers are introduced in aqueous solution into the formation or deposit. The concentration of aqueous polymer solution can be chosen within wide ranges and is preferably from 50 to 50 000, in particular from 500 to 5 000, ppm by weight. The amount of the copolymer which is introduced into the production zone around the borehole depends on the local conditions. In most cases, it is from 50 to 5 000 kg and preferably from 200 to 1 000 kg per meter of the treated zone. As a further component, the polymer solution may comprise one or more salts of alkali metals or alkaline earth metals, in particular NaCl, KCl, $MgCl_2$, $MgSO_4$, $CaCl_2$, $Na_2SO_4$, $K_2SO_4$ and/or $NaNO_3$, and generally chlorides, sulfates or nitrates of metals, such as, for example, sodium, potassium, calcium or magnesium. Solutions which comprise sodium chloride or potassium chloride are preferred. Sea water, formation water or process water are particularly preferred. The salts of the alkaline earth metals are less desirable, in particular in relatively large amounts, since they may produce undesired precipitates, for example if the medium contains carbonates or sulfates or has a pH which is equal to or higher than 9.

The concentration of salts of the salt-containing polymer solution may be chosen within wide ranges. It depends on the nature and on the concentration of salt of the water of the deposit and also on the nature of the salt which is present in the polymer solution, so that it is not possible to specify a general range of usable values. It is preferable to use potassium chloride, which prevents the swelling of clay in the formations. Swelling of clay could lead to irreversible formation damage.

In general, the viscosity of the polymer solution decreases for a given salt if the concentration of the salt increases. A polymer solution whose salt content of sodium chloride is higher than the salt content of the water of the deposit can therefore advantageously be used according to the present method.

The method of introduction of the polymer solution is not novel per se. It is possible to refer, for example, to the explanations in U.S. Pat. No. 3,308,885. In general, the pressure exerted on the polymer solution is one which is greater than the pressure which is exerted by the fluids, such as deposit water, oil and hydrocarbon gas, in the deposit, which is chosen for the method of treatment (deposit pressure) but which is below the pressure which leads to hydraulic break-up of the deposit or reaches not more than said pressure.

In a preferred embodiment of the method, the formation to be treated is flooded beforehand.

In a further preferred embodiment of the method, water, water in which salts may have been dissolved, a buffer solution or a thickened aqueous polymer solution in which additionally salts may have been dissolved is introduced as the spacer into the borehole between the introduction of the copolymer and the introduction of the crosslinking agent.

In a further preferred embodiment, the above-described introduction of a spacer can also or additionally be effected after the introduction of the crosslinking agent.

In a further preferred embodiment, a longer or shorter phase of inclusion can take place after the introduction of the solutions of the copolymer and of the crosslinking agent, before the probe is changed over again to production.

The introduction of copolymer solution and crosslinking agent can also be repeated in any desired ratios before or after the probe is switched back again to production. This makes it possible to treat different zones specifically.

In a further preferred embodiment, portions or else the total polymer/water mixtures are pretreated with crosslinking agent before being injected.

The crosslinking of the polymer can, if required, be eliminated by the action of certain substances on the gel barrier. Compositions which are stronger complex ligands for the metal ion than the phosphonic acid or amine or amide groups of the polymer, and oxidizing agents, are in principle suitable. In this context, hydrofluoric acid or its precursors and strong chelating agents, such as, for example, EDTA, have proven useful. Among the oxidizing agents, persulfates, perborates and hydrogen peroxide have proven useful.

Preferred crosslinking agents are compounds of zirconium and/or of titanium. Chelates of zirconium(IV) are particularly preferred, especially zirconium lactate and zirconium gluconate. The solutions of crosslinking agents are generally adjusted to neutral pH with amines, such as diisopropylamine or isopropylamine, prior to the introduction. The concentration of the crosslinking agent in the aqueous solution may vary over a wide range from 0.001 to 0.5% by weight, based on the zirconium and/or titanium concentration. The concentration of crosslinking agent is preferably in the range from 0.01 to 0.2% by weight, in particular in the range from 0.025 to 0.2% by weight, especially from 0.025 to 0.15% by weight, based on the zirconium and/or titanium concentration.

The copolymer solution and the solution of crosslinking agent can preferably be buffered in the range from pH 4 to 6, in particular from 4.5 to 5.5.

DETAILED DESCRIPTION OF THE FIGURE

In the FIGURE, the experimental test setup employed in the examples is represented. Referring to the FIGURE, the sand packing 108 is installed in a thermostated oven 111. Carbon dioxide gas is introduced via line 10, pressure control valve 105, line 12, valve 106 and pressure sensor 107 to the inlet line 20 to the sand packing 108. Liquids are introduced to the sand packing 108 from HPLC pump 101, line 14, two-way valve 102, valve 106, and pressure sensor 107 to the inlet line 20. Alternately, liquids from two-way valve 102 are directed to a waste tank 103, via line 32. Effluent from the sand packing is passed via outlet line 22, pressure sensor 109, line 24, and back-pressure controller 110 to tank 112.

EXAMPLES

The examples listed below for the synthesis of suitable polymers illustrate the invention but do not limit it. The abbreviations used in the working examples and table examples have the following meaning:

TABLE 1

| Abbreviations used | |
|---|---|
| AM | Acrylamide |
| AMPS ® | 2-Acrylamido-2-methylpropanesulfonic acid |
| NVCap | N-Vinylcaprolactam |
| NVF | Vinylformamide |
| NVP | N-Vinylpyrrolidone |
| VIMA | N-Vinyl-N-methylacetamide |
| VPA | Vinylphosphonic acid |

Example 1

Emulsion Polymerization 7.5 g of Arkopal® N 100 (nonionic emulsifier based on an oxyethylated phenol derivative) and 20.5 g of Span® 80 (nonionic emulsifier based on a sugar alcohol stearate) were dissolved in 350 ml of Isopar® M (industrial mixture of isoparaffin having a boiling point of about 200–240° C.) and the resulting solution was introduced into a 1 l reaction vessel which had been provided with a stirrer, a thermometer and a nitrogen inlet. A monomer solution was then prepared by dissolving 55 g of acrylamide, 42 g of AMPS and 2.3 g of vinylphosphonic acid (VPA) in 120 ml of water.

The pH of the monomer solution was adjusted to 8.5 with ammonia (25% strength). 1.5 g of NVF were added to the monomer solution. The aqueous monomer solution was added to the organic phase with rapid stirring. The reaction vessel was evacuated and then filled with nitrogen. Thereafter, a solution of 0.0275 g of ammonium persulfate in 3 ml of water was added to the mixture and the polymerization thus initiated. The reaction lasted for 1–1½ hours, and the reaction temperature was kept at from 30 to 40° C. The result is a stable emulsion which can be inverted in water in a manner known per se with the use of commercial surface-active agents. The resulting polymer solution had a K value of 161.

If 1 ml of a 3% strength titanium acetate, zirconium lactate solution is added to 200 ml of a 0.6% strength aqueous solution of the polymer, a highly viscous solution forms.

Example 2

Solution Polymerization

In a polymerization reactor of 1 liter capacity, equipped with a cover having a plane-ground joint, stirrer, thermometer and gas inlet tube, 75 g of AMPS were dissolved in 400 g of water, 2 g of VPA were added and neutralization was effected with ammonia (25% strength).

23 g of acrylamide and 1 g of NVF were then added.

The pH was adjusted to 8.5 and the reaction mixture was heated to 70° C. with stirring and introduction of nitrogen.

1 g of an aqueous 10% strength dibutylamine HCl solution and 0.1 g of ammonium persulfate were added.

The reaction lasted for about 30 minutes, the temperature increasing to 70° C. The reaction mixture became viscous. It was heated for a further 2 hours at 80° C. with stirring. A clear, highly viscous solution was obtained. The K value was 193.

Example 3

Gel Polymerization

In a polymerization flask of 1 l capacity, equipped with a cover having a plane-ground joint, stirrer, thermometer and gas inlet tube, a monomer solution was prepared by dissolving 55 g of acrylamide, 42 g of AMPS and 2.3 g of VPA in 250 g of water. The pH was adjusted to 8.5 with ammonia (25% strength). 1.5 g of NVF were added to the solution. Finally, 1 g of an aqueous 10% strength dibutylamine HCl solution and 0.1 g of ammonium persulfate were added with stirring and introduction of nitrogen. Stirring was continued for a further 3 min at high speed with introduction of nitrogen. The nitrogen introduction was terminated and inlet tube and stirrer were raised. The polymerization started after an induction time of about 30 min, the temperature increasing from 20° C. to 78° C. and the solution changing into a dimensionally stable gel. After a subsequent heating time of 8 h at 60° C., the gel was cooled to room temperature, comminuted, dried and milled. The K value was about 240.

If 1 ml of a 3.6% strength solution of zirconium acetate is added to 200 ml of a 0.5% strength aqueous solution, a highly viscous thixotropic mass forms.

Example 4

Precipitation Polymerization

In a polymerization flask of 1 liter capacity, equipped with stirrer, reflux condenser, thermometer, dropping funnel and gas inlet tube, 75 g of AMPS and 1.5 g of VPA were dissolved in 400 ml of tert-butanol and neutralized with ammonia. The pH was adjusted to 8.5.

23 g of acrylamide and 1 g of NVF were added to this solution. With stirring and introduction of nitrogen, the monomer solution was heated to 60° C. and 1 g of azoisobutyronitrile was added. The polymerization started after an induction time of 3 min, the reaction temperature increased to 80° C. and the polymer was precipitated. Heating was continued for a further 2 h at 80° C. The copolymer can be isolated by filtration with suction and drying. However, it is also possible to distil off the solvent directly under reduced pressure. The polymer was obtained in the form of a white, light powder which dissolved readily in water and had a K value of 205.

The copolymers of the following table were also prepared according to these four procedures.

TABLE 2

Summary of the compositions used for examples 1 to 16

| Examples No. | Polymer | AMPS [g] | AM [g] | VPA [g] | NVF [g] | Further monomers | Further additives | Method | K value |
|---|---|---|---|---|---|---|---|---|---|
| 1 | A | 42 | 55 | 2.3 | 1.5 | — | Arkopal® N 100, Span® 80 | Emulsion | 160 |
| 2 | B | 75 | 23 | 1.5 | 1.0 | — | — | Solution | 193 |
| 3 | C | 42 | 55 | 2.3 | 1.5 | — | — | Gel | 262 |
| 4 | D | 75 | 23 | 1.5 | 1.0 | — | — | Gel | 256 |
| 5 | E | 87 | 11 | 1.3 | 1.0 | — | — | Gel | 257 |
| 6 | F | 87 | 11 | 1.3 | 1.0 | — | — | Precipitation | 199 |
| 7 | G | 98 | 0.3 | 1.3 | 1.0 | — | — | Gel | 243 |
| 8 | H | 98 | 0.3 | 1.3 | 1.0 | — | — | Precipitation | 193 |
| 9 | I | 87 | 11 | 1.3 | 1.0 | — | Arkopal® N 100, Span® 80 | Emulsion | 173 |
| 10 | K | 87 | 11 | 1.3 | — | 2.3 g of NVP | Arkopal® N 100, Span® 80 | Emulsion | 177 |
| 11 | L | 98 | 0.3 | 1.3 | — | 3.0 g of NVCap | — | Gel | 239 |
| 12 | M | 81 | 20 | 2.0 | 5.0 | — | — | Gel | 241 |
| 13 | N | 81 | 20 | 2.0 | 5.0 | — | — | Precipitation | 195 |
| 14 | O | 80 | 20 | 5.0 | 1.0 | — | — | Gel | 251 |
| 15 | P | 95 | 0.25 | 2.5 | 2.5 | — | — | Gel | 234 |
| 16 | Q | 75 | 23 | 1.5 | 1.0 | — | — | Precipitation | 205 |

Example 17

Preparation for and Implementation of Sand Packing Tests for RPM Treatment Using Polymer D as an Example This test method constitutes a simple model system for deposits. The radial distribution of material around a drilling probe can thus be adjusted. It serves for screening substances under reproducible conditions. This method has been used for testing and comparing the treatment methods and substances according to the invention. Compared with core-flood tests, this method has the advantages that it is more easily reproducible, the materials are commercially available, the desired permeability can be freely determined and is reproducible and, by means of the length of the packing, it is possible to simulate a larger radius around the probe than by means of core-flood tests. The comparability with core-flood tests was confirmed by comparative measurements.

Procedure for Sand Packing Tests

This example describes the procedure for sand packing tests for characterizing RPM materials. The preparation and conditioning of a sand packing test are described as well as the procedure for the RPM laboratory treatment and the evaluation of the data.

Preparation of the Sand Packing

The sand packings which were used in these examples should simulate the porosity or permeability of the deposits in which the RPM treatment is to be used. By using a series of sand fractions or mixtures thereof, it was possible to establish the permeability desired in each case. Typical size distributions for sand fractions as used for the preparation of the sand packings are summarized in table 3.

TABLE 3

Size distributions of the sand fractions for the preparation of sand packings.

| Sand fraction | Size distribution |
| --- | --- |
| A | >2.36 mm |
| B | 1.18–2.36 mm |
| C | 300–1180 µm |
| D | 150–300 µm |
| E | 90–150 µm |
| F | <90 µm |

In addition to these commercially available sand fractions, it was possible to produce smaller size distributions by using calibrated sieves. It was possible to produce finer sand fractions by means of silica gel. Examples of packing permeabilities which resulted from the sand fractions from table 1 and mixtures thereof are to be found in table 4. Examples of relevant fields of corresponding permeability are also given there.

TABLE 4

Typical sand compositions for special field applications

| Sand composition | Permeability [D] | Example field |
| --- | --- | --- |
| 100% of E | 4 | Amberjack (Gulf of Mexico) |
| 100% of D | 12 | — |
| 80% of D:20% of E | 10 | Harding (North Sea) |

Usually, the sand packings are produced in ⅜ inch stainless steel capillaries having an internal diameter of ¼ inch. All stated volumes were calculated using this large wall thickness. Capillaries of 1.5 m (5 ft) each were connected by means of standard Swagelok® ⅜ inch screw unions to give a 4.5 m (15 ft) length and were closed by ⅜ inch-to-¼ inch fittings. The sand packings were prepared by the following standard procedure:

The appropriate number of 1.5 m segments of ⅜ inch capillary were provided with ⅜ inch Swagelok® screw unions and ring fittings. The end of the packing was closed by means of a ⅜ inch-to-¼ inch fitting, in front of the ⅜ inch end of which a 90 µm stainless steel sieve plate was mounted (finer sieve plates were used for finer sands). The sand was introduced into the first 1.5 m segment with the aid of a funnel. For improving the packing, the capillary was tapped vigorously with a metal rod. When no further sand could be packed into the capillary, the funnel was removed and was replaced by a ⅜ inch blind screw. The capillary was then rolled up over a template to a diameter of 25 cm. Rolling up the capillary promotes the compression of the sand in the packing. The blind screw was removed and the next 1.5 m segment, provided with a blind screw, was packed in the same way as the first one and was screwed on and rolled up. This process was repeated three times. When the last 1.5 m segment had been packed, the final ⅜ inch screw union was removed and was replaced by a ⅜ inch-to-¼ inch fitting with a 90 µm sieve plate at the end of the capillary. The last straight section of the capillary was then wound in order to obtain a packing having parallel entrances and exits. The packing was then flushed with a water-soluble gas, such as, for example, carbon dioxide, for 30 min at an initial pressure of 4.4 bar (30 psi) in order to expel all the included air. Thereafter, the packing was closed and the dry weight determined.

Conditioning of the Sand Packing

Before the laboratory treatment, the filled, wound sand packing flushed with carbon dioxide had to be conditioned with water and oil. For this purpose, the sand packing with the inlets and outlets was installed in a thermostated oven. Before the packing was heated to the test temperature, the pore volume was determined by comparative weighing after filling of the packing with distilled water. A schematic diagram of the experimental setup is shown in FIG. 1. Typically, the back pressure was set to less than 5 bar (e.g. 2 bar) in the examples.

Thereafter, the packing was heated to the test temperature and conditioned with the test water (synthetic sea water or formation water), with the crude oil and finally again with the test water. Typically, synthetic formation water or sea water was used for the laboratory tests. As far as possible, genuine field crude oil should be used. Up to 15% of toluene were added to said crude oil in order to compensate for the loss of readily volatile components and the associated change in the viscosity. The crude oil was freed of larger impurities using a 1 µm filter. The procedure in detail:

The dry sand packing flushed with carbon dioxide was weighed. The packing was connected by means of the ¼ inch inlets and outlets in the thermostated oven. The end from which the packing was begun was connected to the inlet. The packing remains at room temperature while the pore volume is determined.

The packing was then flooded with a total volume of about 100 ml of demineralized water. The data recorders were mounted at the inlets and outlets and the data recording started.

The water-flooded sand packing was uninstalled and closed. The pore volume was determined by reweighing. For a 4.5 m long E sand packing, this value is typically about 48 ml.

Thereafter, the packing was installed again in the oven and heated to test temperature.

The test water was circulated through the packing at a flow rate of 1 ml/min until a relatively stable counterpressure was reached. Typically, about 2 pore volumes, i.e. about 100 ml, are required for this purpose. The permeability to water can be determined thereby.

Before the conditioning with crude oil, the pump was now first flushed with methanol, then with toluene and finally with crude oil.

The crude oil was then flushed through the sand packing at a flow rate of 1 ml/min until a relatively stable counterpressure was measured and no further water was expelled from the packing ($S_{wi}$). As a rule, two pore volumes are likewise required for this purpose. The permeability to crude oil can be determined thereby.

Before the reconditioning with test water, the pump was now flushed with toluene, then with methanol and finally with test water.

The test water was finally pumped through the packing at a flow rate of 1 ml/min. Once again, about 2 sample volumes were pumped until the pressure drop was constant and no more oil was expelled from the packing ($S_{or}$). The permeability after resetting to water can be determined thereby.

The permeability of the sand packing can then be calculated using the Darcy equation. For this purpose, the packing dimensions, the flow rates, the pressure drop along the packing and the viscosity of the liquid must be known. After the conditioning, the packing is ready to be used for the test.

Determination of the Permeability

The permeability k is defined as:

$$k = \frac{\mu \cdot Q \cdot L}{\Delta p \cdot A} \quad \text{Equation 1}$$

where:

Q=Flow rate [ml/s]

k=Permeability [D]

A=Average area of the capillary [cm$^2$]

L=Length of the packing

δp=Pressure drop along the packing [atm]

μ=Viscosity of the liquid [cP]

For comparative measurements, this access is simple, expedient and sufficiently accurate. For more precise determinations of the absolute permeability, a multirate technique is used. The measurement is more accurate since it is not dependent on an individual pressure measurement but on a plurality of flow rates. Consequently, the result depends on the linearity of the pressure measuring means and not on the absolute accuracy thereof. The test liquid is injected with at least four different constant flow rates in the vicinity of the planned test flow rate. After the pressure drop has stabilized for each flow rate, these values are recorded. The permeability is obtained from the slope of the line of fit, from the Darcy equation (equation 2) rearranged for Q.

$$Q = k \frac{A \cdot \delta p}{\mu \cdot L} \quad \text{Equation 2}$$

Each flow rate Q is plotted against $$\frac{A \cdot \delta p}{\mu \cdot L}.$$

The data should lie on a straight line whose slope k is the permeability. Depending on the statistical significance, the line of fit can be obtained graphically or by regression analysis.

Carrying out RPM test treatments using a sequential treatment with polymer D as an example.

Information on use in the field can be obtained on the basis of the volumes and pumping rates used here. A typical sequential treatment and the pumped volumes thereof on a laboratory scale and in the field are shown in table 5.

TABLE 5

Comparable volumes for laboratory investigations and for use in the field for an RPM treatment

| Treatment step | Solution | Concentration | Volume Field [bbl] | Volume Laboratory [ml] |
| --- | --- | --- | --- | --- |
| Polymer | Polymer D[1] | 2600 ppm | 2800 | 14.2 |
| Spacer | Buffered injection water[1] | 40% acetate buffer | 700 | 3.5 |
| Crosslinking agent | Buffered crosslinking agent | 750 ppm in 40% buffer | 2800 | 14.2 |
| Reflushing | Injection water | — | 2600 | omitted |

[1]Concentrated solutions were diluted with injection water.

For laboratory investigations, polymer and crosslinking agent solutions were prepared using synthetic injection waters. The polymer solution was prepared by slowly sprinkling the polymer powder into the vortex of the vigorously stirred liquid (2.6 g/l). The acetate buffer solution (100%) was prepared by mixing 1 M sodium acetate solution (73 g/l) with 1 M acetic acid (100 ml/l). The buffered crosslinking agent solution was prepared by adding the concentrated zirconium complex solution (10.72 g/l) to a solution of 400 ml/l of buffer solution to give 600 ml/l of injection solution.

All solutions were freshly prepared before the treatment of the sand packing. Before each individual pumping step, the inlet was uninstalled and the test solution pumped at this point. Thereafter, the inlet was mounted again and the desired volume injected. The volumes for a treatment with a permeability of about 10 Darcy, as is typical, for example, for the Harding field in the North Sea, are summarized in table 6.

TABLE 6

Treatment volumes and pumping rates for laboratory investigations for the RPM treatment

| Treatment step | Solution | Concentration | Treatment detail Volume [ml] | Pumping rate [ml/min] |
|---|---|---|---|---|
| Polymer | Polymer D[1] | 2600 ppm | 14.2 | 0.33 |
| Spacer | Buffered injection water[1] | 40% acetate buffer | 3.5 | 0.1 |
| Crosslinking agent | Buffered crosslinking agent | 750 ppm in 40% buffer | 14.2 | 0.1 |
| Reflushing | Injection water | — | 17.7 | 0.05 |

[1]Concentrated solutions were diluted with injection water.

The pump was flushed with polymer solution, the inlet capillary in the packing was removed and the polymer was pumped to the beginning of the packing. The inlet pipe was connected again. The pump was set to the desired pumping volume and flow rate and was started. During the entire test, the pressures at the inlet and outlet were recorded (14.2 ml at 6 ml/h).

As soon as the polymer solution had been introduced, the pump was changed over to the buffered spacer solution. An inlet pipe was again removed, the pump was flushed with buffer solution and preliminary pumping was effected up to the beginning of the packing. The inlet capillary was again connected and the required volume of the spacer solution was injected at the desired flow rate (e.g. 3.5 ml at 6 ml/h).

Typically, the solution of the crosslinking agent was applied in the same manner—as described above—using a separate pump (e.g. 14.2 ml at 6 ml/h). Pumps used for introducing the crosslinking agent should be flushed for one hour with buffer solution before polymer solution is pumped therewith again. Residues of crosslinking agent may result in a polymer gel forming prematurely.

After the introduction of the solution of crosslinking agent, the direction of flow of the sand packing was reversed in order to simulate the production mode of the probe. Before the direction of flow is changed over to the production direction (flowback), an additional shut-in time can be realized (e.g. four hours). As a result of the flowback, polymer and crosslinking agent come into contact and form the gel bank which is intended to reduce the permeability to water.

The pump with which polymer solution and spacer solution were pumped was flushed with the injection water which was also used for conditioning the packing. The injection water in turn was pumped to the end of the inlet pipe and connected to the sand packing. In this way, the combined volume of spacer and polymer solution was pumped back (e.g. 17.7 ml at 3 ml/h).

The packing can now again be shut in for, for example, 48 h to enable the gel block to form.

After the gel block had developed, the blocking factor was determined. For this purpose, formation water (injection water, as for conditioning) was pumped through the gel block and the pressure drop noted as soon as the value had stabilized. Thereafter, crude oil was pumped until a stable pressure drop could be noted.

Determination of the Blocking Factors for Water and Oil

After the RPM treatment has been carried out, the blocking factors for water and oil were determined. The values were obtained from the comparison of the relative pressure drops (or permeabilities) which were measured during the conditioning phase of the sand packing for oil (oil with residual water) and for water (after the oil flooding, SOR) with the corresponding values which were reached after the treatment. It is important to correct the measured pressure drops with respect to the flow rates used, since the flow rates in the form of the pumping rates are often substantially greater during the conditioning phase than after the treatment. Typically, a packing was conditioned at 60 ml/h, and flow rates of 1–2 ml/h were used after the treatment.

After the treatment has been flushed back, it was shut in for 48 hours. The blocking factors for water and for oil were then determined.

First, depending on the size of the resulting block, formation water was flushed through the sand packing at a flow rate of 1–2 ml/h. The actually applied flow rate depends on the magnitude of the pressure drop along the packing, since the pump and the pressure control valve are limited to 100 bar. Formation water was pumped until the pressure drop had stabilized. Usually, about two pore volumes are required for this purpose.

This was then carried out at the same flow rate with crude oil, likewise until the pressure drop had stabilized.

The blocking factor for water was obtained as a quotient of the pressure drop after the treatment and the pressure drop for water after the conditioning with oil ($S_{OR}$).

The blocking factor for oil is the quotient of the pressure drop for oil after the treatment and the pressure drop for oil when the packing was conditioned with oil ($S_{WI}$).

Example 18

Sequential Treatment with Polymer D as Long-term Test

The sand packing used was conditioned in a 4.5 m long ⅜ inch stainless steel capillary having an internal diameter of ¼ inch. The absolute permeability of the packing was 3.5 D. The packing had been conditioned at 70° C. up to $S_{orw}$.

The treatment consists of three separate steps (slugs), all of which were carried out at 70° C. and had been prepared in synthetic sea water:

16 ml of a 3 000 ppm solution of polymer D were injected at a pumping rate of 20 ml/h.

2 ml of acetate buffer (0.03 M sodium acetate, 0.04 M acetic acid) were injected at a rate of 20 ml/h.

16 ml of zirconium lactate solution, diluted 1:93 w/w, were injected at a pumping rate of 1 ml/h.

The sand packing was then shut in for 5 h. Thereafter, 18 ml of synthetic sea water were pumped back through the packing in the opposite direction at a pumping rate of 1 ml/h. The packing was then shut in for 50 h.

The back-washing was begun with synthetic sea water at a rate of 1 ml/h at 70° C. After 4 days, the temperature was increased to 100° C.

The following blocking factors for water ($RF_w$) were measured over a period of 150 days:

| Time [d] | Blocking factor [RFw] |
|---|---|
| 10 | 260 |
| 50 | 296 |
| 100 | 270 |
| 150 | 245 |

Example 19

Sequential Treatment with Polymer C as High-temperature Test

The sand packing used was conditioned in a 4.5 m long ⅜ inch stainless steel capillary having an internal diameter of ¼ inch. The absolute permeability of the packing was 9 D. The packing had been conditioned at 62° C. up to $S_{orw}$.

The treatment consists of three separate steps (slugs), all of which were carried out at 62° C. and had been prepared in synthetic sea water: 16 ml of a 3 000 ppm solution of polymer C were injected at a pumping rate of 20 ml/h.

2 ml of acetate buffer (0.03 M sodium acetate, 0.04 M acetic acid) were injected at a rate of 20 ml/h.

16 ml of zirconium lactate solution, diluted 1:93 w/w, were injected at a pumping rate of 1 ml/h.

The sand packing was then shut in for 5 h. Thereafter, 18 ml of synthetic sea water were pumped back through the packing in the opposite direction at a pumping rate of 1 ml/h. The packing was then shut in for 50 h.

The back-washing was begun with synthetic sea water at a rate of 1 ml/h at 70° C. After 4 days, the temperature was increased to 95° C.

The following blocking factors for water ($RF_w$) were measured over a period of 150 days:

| Time [d] | Blocking factor [RFw] |
|---|---|
| 2 | 270 |
| 29 | 270 |

The temperature of the packing was finally increased further to 123° C. The following blocking factors were then measured therewith:

| Time [d] | Blocking factor [RFw] |
|---|---|
| 1 | 225 |
| 3 | 100 |
| 5 | 30 |

Conclusion: While polymer C exhibits a constant high blocking factor at a temperature of use of 95° C. for 29 days, the blocking factor decreases from 270 to 30 in the course of 5 days at a temperature of 123° C.

Example 20

Sequential Treatment with Polymer D as High-temperature Test

The sand packing used was conditioned in a 4.5 m long ⅜ inch stainless steel capillary having an internal diameter of ¼ inch. The absolute permeability of the packing was 9 D. The packing had been conditioned at 62° C. up to $S_{orw}$.

The treatment consists of three separate steps (slugs), all of which were carried out at 62° C. and had been prepared in synthetic formation water: 16 ml of a 3 000 ppm solution of polymer D were injected at a pumping rate of 20 ml/h.

2 ml of acetate buffer (0.03 M sodium acetate, 0.04 M acetic acid) were injected at a rate of 20 ml/h.

16 ml of zirconium lactate solution (Halliburton CL23), diluted 1:93 w/w, were injected at a pumping rate of 1 ml/h.

The sand packing was then shut in for 5 h. Thereafter, 18 ml of synthetic sea water were pumped back through the packing in the opposite direction at a pumping rate of 1 ml/h. The packing was then shut in for 50 h.

The back-washing was begun with synthetic formation water at a rate of 1 ml/h at 62° C. After 6 days, a water blocking factor of 22 was found and the temperature increased to 123° C.

The following blocking factors for water ($RF_w$) were measured over a period of 27 days:

| Time [d] | Blocking factor [RFw] |
|---|---|
| 1 | 35 |
| 3 | 37 |
| 5 | 38 |
| 10 | 27 |
| 15 | 25 |
| 20 | 13 |
| 25 | 9 |
| 27 | 7 |

Example 21

Co-injection of Polymer E as High-temperature Test

The sand packing used was conditioned in a 4.5 m long ⅜ inch stainless steel capillary having an internal diameter of ¼ inch. The absolute permeability of the packing was 9 D. The packing had been conditioned at 70° C. up to $S_{orw}$.

The treatment was carried out as a simultaneous injection of polymer solution and buffered solution of crosslinking agent from two different pumps which opened together into the inlet of the sand packing. Both solutions were prepared at 70° C. in synthetic sea water.

Pump 1:

26.5 ml of a 4 500 ppm polymer E solution at a rate of 26.5 ml/h

Pump 2:

3.5 ml of a zirconium lactate solution, diluted to 1:93 w/w, buffered with 0.03 M sodium acetate and 0.04 M acetic acid, injected at a rate of 3.5 ml/h The sand packing was then shut in for 45 h. Thereafter, synthetic sea water was back-washed continuously through the packing for three days at 70° C. at a rate of 3 ml/h.

The following water blocking factors ($RF_w$) were measured

| Time [d] | Blocking factor [RFw] |
|---|---|
| 1 | 26 |
| 5 | 34 |

Thereafter, the temperature of the sand packing was increased to 123° C. and the following blocking factors were measured over the time:

| Time [d] | Blocking factor [RFw] |
|---|---|
| 3 | 62 |
| 7 | 54 |
| 11 | 50 |
| 15 | 47 |
| 17 | 43 |
| 23 | 28 |
| 28 | 23 |
| 33 | 19 |
| 37 | 16 |

Conclusion: Polymer E can be co-injected with the crosslinking agent without problems at 70° C., without a gel block forming prematurely. The gel block forms only during the shut-in time. In comparison with polymer C, a greater thermal stability is detectable.

The invention claimed is:

1. A method for reducing or completely eliminating water influx to a mineral oil or natural gas production borehole by introducing into this borehole an aqueous solution of a copolymer, the copolymer comprising A) 40–98% by weight of structural units of the formula

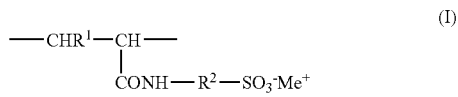

in which
R$^1$ is hydrogen or methyl,
R$^2$ is C$_2$–C$_{10}$-alkylene and
Me$^+$ is an ammonium or an alkali metal ion, B) from 0.1 to 58% by weight of structural units of the formula

C) from 0.1 to 10% by weight of structural units of the formula

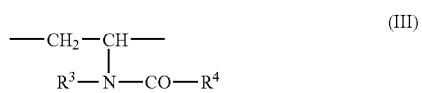

in which
R$^3$ and R$^4$, independently of one another, are hydrogen, methyl or ethyl, or R$^3$ and R$^4$ together are propylene or pentamethylene, and D) from 0.1 to 10% by weight of structural units of the formula

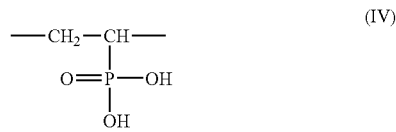

and, simultaneously with the copolymer or thereafter, introducing into the formation or deposit a crosslinking agent of the copolymer, which crosslinking agent is selected from the group consisting of a zirconium, a chromium, a titanium, an aluminum compound, and a mixture thereof, and then putting the borehole for the recovery of mineral oil or natural gas or a mixture thereof into operation.

2. The method as claimed in claim 1, wherein the structural units of the formula I are derived from 2-acrylamido-2-methylpropanesulfonic acid.

3. The method as claimed in claim 1, wherein the copolymer comprises from 50 to 98% by weight of the structural units of the formula I.

4. The method as claimed in claim 1, wherein the structural units B are present in an amount of from 2 to 45% by weight.

5. The method as claimed in claim 1, wherein, in the structural units C), R$^3$ and R$^4$ are hydrogen.

6. The method as claimed in claim 1, wherein the copolymer comprises from 0.5 to 5% by weight of structural units C).

7. The method as claimed in claim 1, wherein the copolymer comprises from 0.5 to 5% by weight of structural units D).

8. The method as claimed in claim 1, wherein the molecular weight of the copolymer is from 50 000 to 2×10$^7$ g/mol.

9. The method as claimed in claim 1, wherein the structural units A), B), C) and D) sum to 100% by weight.

10. The method as claimed in claim 1, wherein the formation to be treated is flooded before introduction of the copolymer.

11. The method as claimed in claim 1, wherein water, water in which salts may have been dissolved, a buffer solution or a thickened aqueous polymer solution in which salts may additionally have been dissolved is introduced as a spacer into the borehole between the introduction of the copolymer and the introduction of the crosslinking agent or said spacer is effected after the introduction of the crosslinking agent.

12. The method as claimed in claim 11, wherein the introduction of a spacer is effected after the introduction of the crosslinking agent.

13. The method as claimed in claim 1, wherein the introduction of copolymer solution and crosslinking agent is introduced using a probe and wherein, after the introduction of the solutions of the copolymer and of the crosslinking agent, a shut-in phase lasting for from 2 hours to 10 days, takes place before the probe is changed back to production.

14. The method as claimed in claim 13, wherein the shut in phase lasts for from 3 to 50 hours.

15. The method as claimed in claim 1, wherein the introduction of copolymer solution and crosslinking agent is introduced using a probe and repeated in any desired ratios before or after the probe is switched back to production.

16. The method as claimed in claim 1, wherein at least a portion of the total polymer/water mixture is pretreated with crosslinking agent before being the introduction step.

17. The method as claimed in claim 16, wherein the crosslinking of the polymer is eliminated by the action of suitable substances on the gel barrier formed as a result of contact of the copolymer and crosslinking agent.

18. The method as claimed in claim 17, wherein the suitable substances are hydrofluoric acid or its precursors, strong chelating agents, EDTA, persulfates, perborates or hydrogen peroxide.

19. The method as claimed in claim 1, wherein the crosslinking agent is a compound of zirconium and/or of titanium.

20. The method as claimed in claim 19, wherein the concentration of the crosslinking agent in the aqueous solution is from 0.001 to 0.5% by weight, based on the zirconium concentration and/or titanium concentration.

21. The method as claimed in claim 1, wherein the copolymer and crosslinking agent solution is buffered in the range from pH 4 to 6.

22. The method as claimed in claim 21, wherein the copolymer and crosslinking agent solution is buffered in the range from pH from 4.5 to 5.5.

23. A copolymer which comprises structural units A), B), C) and D) as defined in claim 1.

24. A composition comprising a copolymer as claimed in claim 23 and at least one titanium, chromium, zirconium or aluminum compound.

* * * * *